(12) United States Patent
Xu et al.

(10) Patent No.: US 11,197,207 B2
(45) Date of Patent: Dec. 7, 2021

(54) SWITCH SUPPORTING METHOD

(71) Applicant: Samsung Electronics Co., Ltd., Suwon-si (KR)

(72) Inventors: Lixiang Xu, Beijing (CN); Hong Wang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/693,841

(22) Filed: Nov. 25, 2019

(65) Prior Publication Data

US 2020/0092760 A1    Mar. 19, 2020

Related U.S. Application Data

(63) Continuation of application No. 14/770,693, filed as application No. PCT/KR2014/002045 on Mar. 21, 2014, now Pat. No. 10,492,109.

(30) Foreign Application Priority Data

Mar. 21, 2013    (CN) .......................... 201310092326.7

(51) Int. Cl.
    *H04W 4/00*    (2018.01)
    *H04W 36/00*    (2009.01)
    (Continued)

(52) U.S. Cl.
    CPC ....... *H04W 36/0027* (2013.01); *H04L 5/0053* (2013.01); *H04W 76/20* (2018.02);
    (Continued)

(58) Field of Classification Search
    CPC ................ H04W 80/04; H04W 36/18; H04W 36/0011; H04W 36/14; H04W 36/08;
    (Continued)

(56) References Cited

U.S. PATENT DOCUMENTS

2008/0039096 A1    2/2008  Forsberg
2011/0002292 A1    1/2011  Wang et al.
(Continued)

FOREIGN PATENT DOCUMENTS

CN        101521869 A    9/2009
CN        102238669 A    11/2011
(Continued)

OTHER PUBLICATIONS

3GPP; 3GPP TS 36.300 V11.5.0; 3rd Generation Partnership Project; TSGRAN; E-UTRA and E-UTRAN; Overall description; Stage 2 (Release 11); Mar. 18, 2013.
(Continued)

*Primary Examiner* — Siren Wei
(74) *Attorney, Agent, or Firm* — Jefferson IP Law, LLP

(57) ABSTRACT

The present application discloses a switch supporting method comprising: an eNB sends a path switching request message to an MME to notify the MME of information on a bearer remaining unchanged; the MME reserves the bearer remaining unchanged and does not trigger a deactivation process for the bearer remaining unchanged; the MME sends a modify bearer request message to an SGW. With the present application, data loss can be avoided and service continuity is ensured when a UE moves in a small cell scenario.

20 Claims, 7 Drawing Sheets

(51) Int. Cl.
*H04W 76/34* (2018.01)
*H04W 76/20* (2018.01)
*H04L 5/00* (2006.01)
*H04W 76/11* (2018.01)

(52) U.S. Cl.
CPC ........ *H04W 76/34* (2018.02); *H04W 36/0069* (2018.08); *H04W 76/11* (2018.02)

(58) Field of Classification Search
CPC ............ H04W 36/0027; H04W 76/20; H04W 76/34; H04L 5/0053
See application file for complete search history.

(56) References Cited

U.S. PATENT DOCUMENTS

| | | |
|---|---|---|
| 2011/0075675 A1 | 3/2011 | Koodli et al. |
| 2011/0206005 A1 | 8/2011 | Tanabe et al. |
| 2011/0269465 A1 | 11/2011 | Xu et al. |
| 2012/0142278 A1 | 6/2012 | Wang et al. |
| 2012/0297009 A1 | 11/2012 | Amir et al. |
| 2013/0005340 A1* | 1/2013 | Drazynski ............. H04W 8/186 455/436 |
| 2013/0170347 A1 | 7/2013 | Zhang et al. |
| 2013/0176988 A1 | 7/2013 | Wang et al. |
| 2014/0293958 A1* | 10/2014 | Teyeb ............... H04W 36/0072 370/331 |

FOREIGN PATENT DOCUMENTS

| | | |
|---|---|---|
| CN | 102612163 A | 7/2012 |
| WO | 2011/100492 A1 | 8/2011 |
| WO | WO-2011100492 A1 * | 8/2011 ........... H04L 5/0091 |

OTHER PUBLICATIONS

3GPP; 3GPP TS 36.413 V11.3.0; 3rd Generation Partnership Project; TSGRAN; E-UTRAN; S1AP (Release 11); Mar. 18, 2013.
Samsung; Dual Connectivity Impact to S1/X2; 3GPP TSG-RAN WG3 #83; R3-140144; Feb. 10-14, 2014; Prague, Czech Republic.
3GPP TS 36.413 V11.3.0, E-UTRAN S1AP, Mar. 6, 2013.
U.S. Appl. No. 61/678,772 Provisional Specification.
Intel Corporation : "Discussion on minimizing UE context transfer and signaling to CN", 3GPP Draft; R2-130572, Jan. 19, 2013.
European Office Action dated Sep. 28, 2018, issued in European Patent Application No. 14 770 851.5.
Chinese Office Action dated May 24, 2021, issued in a counterpart Chinese Application No. 201910906688.2.

* cited by examiner

SWITCH SUPPORTING METHOD

CROSS-REFERENCE TO RELATED APPLICATION(S)

This application is a continuation application of prior application Ser. No. 14/770,693, filed on Aug. 26, 2015, which is a U.S. National Stage application under 35 U.S.C. § 371 of an International application filed on Mar. 12, 2014 and assigned application number PCT/KR2014/002045, which claimed the benefit of a Chinese patent application filed on Mar. 21, 2013 in the Chinese Intellectual Property Office and assigned Serial number 201310092326.7, the entire disclosures of which are hereby incorporated by reference.

TECHNICAL FIELD

The present invention relates to wireless communication technologies and, more particularly, to a switch supporting method.

BACKGROUND

Modern mobile communication tends to provide users with multimedia services at high transfer rates more and more. FIG. 1 is a system architecture diagram of the System Architecture Evolution (SAE). In this figure, a User Equipment (UE) 101 is a terminal device for receiving data. An Evolved Universal Terrestrial Radio Access Network (E-UTRAN) is a radio access network including a macro base station (eNodeB/NodeB) to provide a UE with a wireless network interface. A Mobility Management Entity (MME) 103 is responsible for managing a mobile context, a session context and security information of a UE. A Serving Gateway SGW (SGW) 104 mainly provides user plane functions, and may be located in the same physical entity as the MME 103. A Packet Data Network Gateway (PGW) 105 is responsible for functions such as charging and lawful interception and may be located in the same physical entity as the SGW 104. A Policy and Charging Rules Function (PCRF) entity 106 provides a policy of Quality of Service (QoS) and charging rules. A Serving GPRS Support Node (SGSN) 108 is a network node device to provide routing for data transmission in a Universal Mobile Telecommunications System (UNITS). A Home Subscriber Server (HSS) 109 is a home ownership subsystem of the UE and is responsible for protecting user information such as a current position of the UE, an address of a service node, user security information, and a packet data context of the UE.

3GPP proposes in Release 12 (Rel-12) demands on enhancement of a small cell. As shown in FIG. 2, target scenarios of small cell enhancement includes a scenario where there is macro cell coverage and a scenario where there is no macro cell coverage and enhancement for indoor and outdoor, ideal and non-ideal backhaul.

In a case where there is macro cell coverage, a technology that carrier aggregation between different base stations can be applied is proposed. A macro cell and a small cell may operate at different frequency bands. There are multiple architectures for the technology of applying carrier aggregation between different base stations, e.g., a Radio Access Network based separation architecture and a Core Network (CN) based separation architecture. The CN based separation architecture means that for a bearer established on a pico cell (pico), data are directly sent to the pico by an SGW of the core network and are not forwarded by a user plane via a macro cell (macro).

At present, there is not a solution to how to correctly notify the core network of switch of bearers for this CN based separation architecture yet.

Especially, there are the following specific problems if an existing path switching process is to be used to notify the core network of switch of bearers.

SUMMARY

Problem I, after a UE hand over from a source base station to a destination base station and the destination base station receives a handover complete message from the UE, the destination base station sends a path switching message to notify the core network that downlink information of a bearer needs to be switched. If the number of bearers contained in an MME UE context is for example 3 and the number of bearers contained in the path switching message is 2, the MME thinks that an access network implicitly releases the bearer that is not contained in the path switching message and thus the MME will trigger a bearer deactivation process. And, an SGW will discard received data and will not send a downlink data notification to the MME when receiving data on the bearer. As for cases of CA between different base stations, if in a case a bearer at a pico is switched to another pico and a bearer at a macro remains unchanged, notifying the MME in the above manner will result in that the bearer at the macro is released. Thus, data loss is caused and service continuity and user experience are affected. If in a case only a bearer at a macro is switched from one base station to another base station and a bearer at a pico remains unchanged, it will be resulted in that the bearer at the pico is released innocently. Thus, data loss is caused and service continuity and user experience are affected.

Problem II, the MME will assign a new MME UE S1AP ID to the UE when receiving the path switching message. If S1 is only present between the MME and an eNB in a inter-eNB CA architecture, in a case where the eNB remains unchanged, the MME does not need to assign an MME UE S1AP ID to the UE. Otherwise, there will be two logic connections for the UE in a same interface, which is an error.

Problem III, the MME will provide a new pair of NH and NCC to a base station when receiving the path switching message. In dependence on how a security mechanism is made when inter-eNB CA is implemented, the MME's providing a new pair of NH and NCC to a base station may result in that the NCCs at the UE and at the network side do not match.

In the inter-eNB CA architecture, there is a master eNB which terminate the S1 between the eNB and the MME and/or terminate the RRC between the eNB and UE. Normally, master eNB is eNB. Therefore, in above, macro as master eNB is taken as example. This does not exclude that other base station can be master eNB.

The present invention provides a switch supporting method which can notify a core network of switch of bearers correctly and solves the above specific problems. Thereby, correct processing of switch for a UE during its movement in a small cell scenario is ensured and thus data loss is avoided, service continuity is ensured and user experience is improved.

A switch supporting method comprising:

sending, by a eNB, a path switching request message to an MME to notify the MME of information on a bearer remaining unchanged;

reserving, by the MME, the bearer remaining unchanged; and sending, by the MME, a modify bearer request message to an SGW.

Preferably, notifying the MME of information on a bearer remaining unchanged comprises: including a list of identifiers of bearers remaining unchanged in the path switching request message.

Preferably, notifying the MME of information on a bearer remaining unchanged comprises: including in the path switching request message indication information for indicating the MME that a bearer not in a list of identifiers of bearers to be switched is not released.

Preferably, the MME keeps an SGW serving the UE unchanged after receiving the information on a bearer remaining unchanged.

Preferably, the MME notifies in the modify bearer request message the SGW of context information of the bearer remaining unchanged.

Preferably, the MME notifies the SGW of context information of the bearer remaining unchanged in one of the following manners:

including in the modify bearer request message a list of identifiers of bearers remaining unchanged. The context information of those bearers remains unchanged; and including in the modify bearer request message context information of a bearer to be modified and context information of a bearer to be deleted, and taking, by the SGW, context information of a bearer that is not included in the context information of a bearer to be modified or in the context information of a bearer to be deleted as context information of a bearer remaining unchanged.

Preferably, the SGW reserves a received downlink data packet for a bearer whose bearer context information remains unchanged.

A switch supporting method comprising:

sending, by a eNB, a path switching request message to an MME to notify the MME to reuse an MME UE S1AP ID prior to switch;

sending, by the MME, a path switch request confirmation message to the eNB and sending the MME UE S1AP ID prior to switch to the base station.

Preferably, to notify the MME to reuse an MME UE S1AP ID prior to switch comprises one of the following manners:

including in the path switching request message indication information for reusing an MME UE S1AP ID prior to switch;

notifying in the path switching request message the MME of information on a bearer remaining unchanged for indicating the MME to reuse an MME UE S1AP ID prior to switch;

including in the path switching request message an Evolved Cell Global Identifier (ECGI) to notify the MME to reuse an MME UE S1AP ID prior to switch by using the same serving cell or the same serving base station for the UE prior to and after the switch.

A switch supporting method comprising:

sending, by a eNB, a path switching request message to an MME and notifying in the path switching request message the MME to reuse a security context prior to switch;

sending, by the MME, a security context prior to switch to the eNB.

Preferably, notifying in the path switching request message the MME to reuse a security context prior to switch comprising:

including in the path switching request message indication information for reusing a security context prior to switch for indicating the MME to reuse a security context prior to switch;

notifying in the path switching request message the MME of information on a bearer remaining unchanged for indicating the MME to reuse a security context prior to switch;

including in the path switching request message an Evolved Cell Global Identifier (ECGI) to notify the MME to reuse a security context prior to switch by using the same serving cell or the same serving base station for the UE prior to and after the switch.

As can be seen from the above technical solutions, in accordance with a switch supporting method provided by the present invention, a eNB notifies the MME of presence of a bearer remaining unchanged and information of the bearer when sending a path switching request message to an MME. The MME reserves the bearer remaining unchanged and sends a modify bearer request message to an SGW to notify the SGW of context information of the bearer remaining unchanged so that the SGW does not discard the data packet but notifies the MME that new data are received after receiving a data packet of the bearer. With the above method, correct processing of switch for a UE during its movement in a small cell scenario can be ensured and thus data loss is avoided and service continuity is ensured.

DETAILED DESCRIPTION

The present invention is hereinafter described in detail with reference to the drawings so as to make the objective, technical means and merits thereof clearer.

Figure 1:
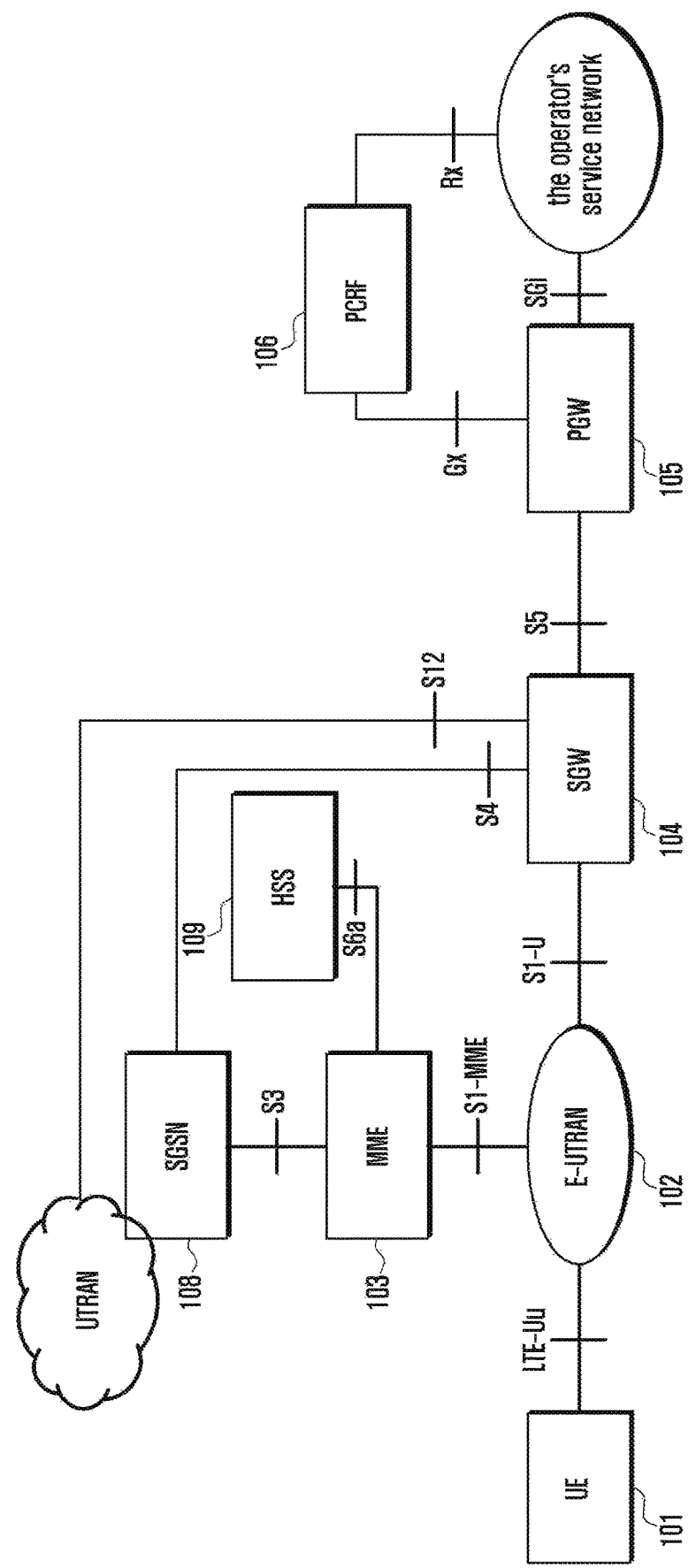
FIG. 1 is a system architecture diagram of an existing SAE.
Figure 2:
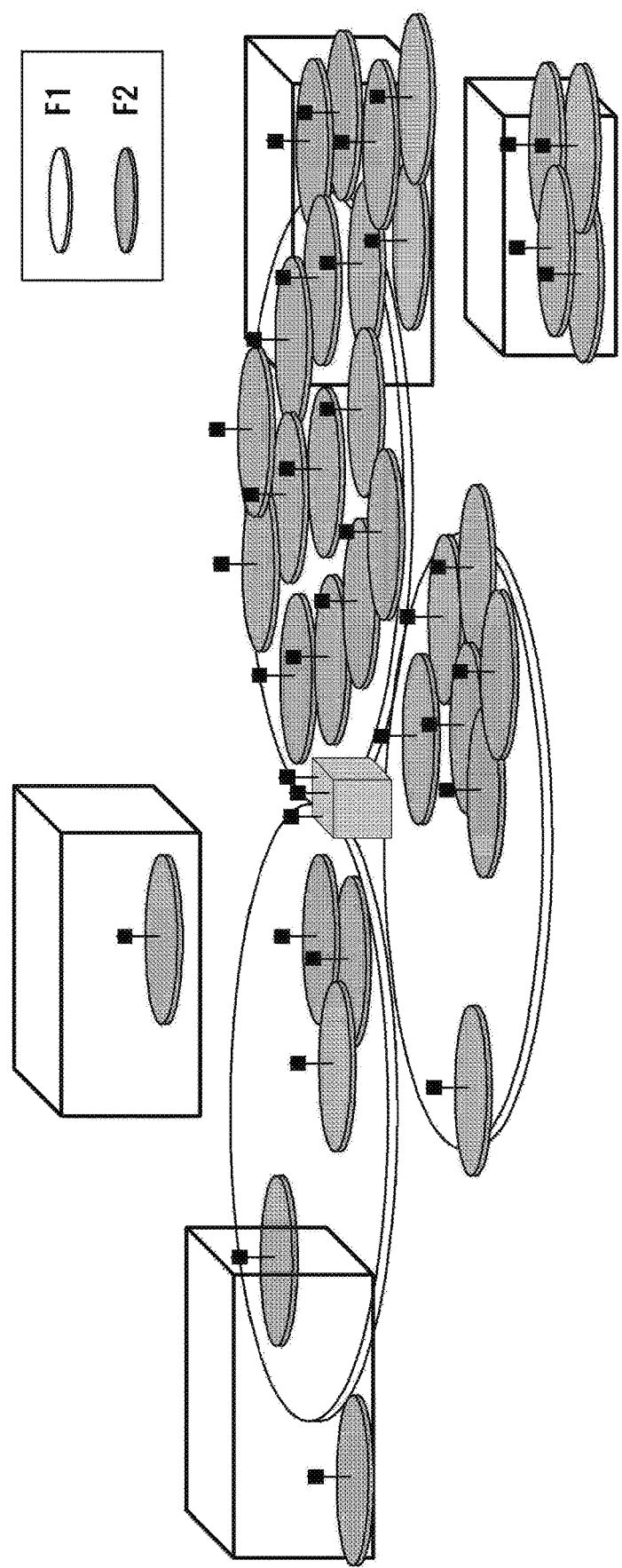
FIG. 2 shows a deployment scenario for enhancement of a small cell.
Figure 3:
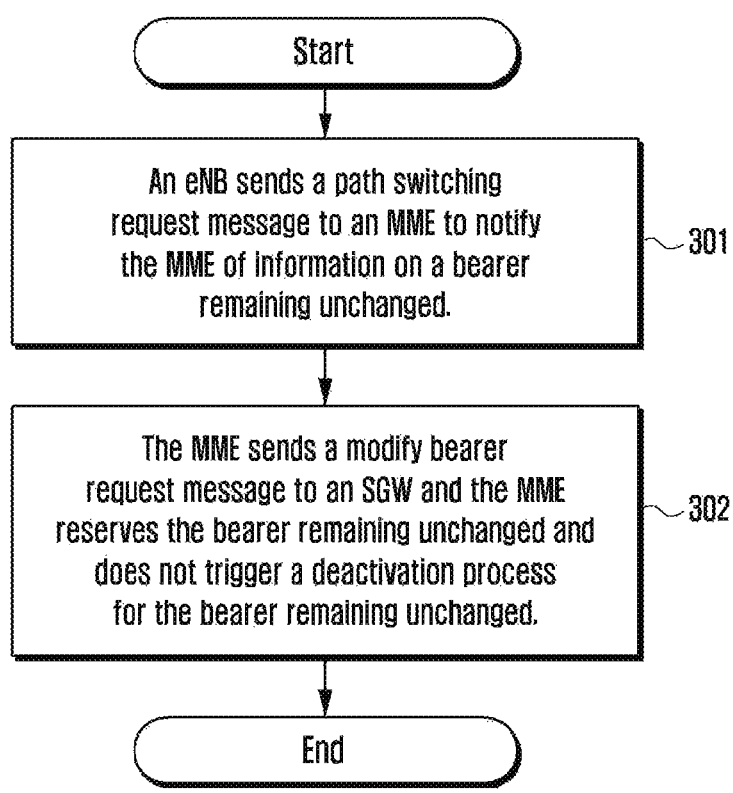
FIG. 3 is a schematic diagram illustrating a switch supporting method of notifying a core network of switch of bearers in accordance with the present invention.

FIG. 3 is a schematic diagram illustrating a switch supporting method of notifying a core network of switch of bearers in accordance with the present invention. The switch supporting method comprises the following steps.

In step 301, an eNB sends a path switching request message to a MME to notify the MME of information on a bearer remaining unchanged (no switch and no release) and information on a switched bearer. The path switching request message contains a list of bearers to be switched.

The eNB notifies the MME of information on a bearer remaining unchanged in one of the following several manners.

Manner I: including a list of identifiers of bearers remaining unchanged in the path switching request message. The MME knows, from the list of identifiers of bearers, bearers that are not switched or released (reserved in the original cell). The MIME reserves the bearers remaining unchanged and does not trigger a bearer deactivation process for the bearers. For bearers present in the UE contexts that are not contained in a list of identifiers of bearers remaining unchanged or in a list of identifiers of bearers to be switched in the path switching request message, the MIME thinks that a base station impliedly releases these bearers and thereby triggers a deactivation process for the bearers.

Manner II: including in the path switching request message indication information for indicating to the MME that bearers not contained in a list of identifiers of bearers to be switched in the path switching request message are not released. The MME knows from the indication information that bearers present in the UE context but not contained in the path switching request message are not implicitly released by the base station, and thus reserves these bearers remaining unchanged and does not trigger a deactivation process for the bearers not contained in the path switching request message.

The MME keeps an SGW serving the UE unchanged and does not select a new SGW for the UE when a path switching request message received by the MME contains information on a bearer remaining unchanged.

In step 302, the MME sends a modify bearer request message to the SGW. The MME does not contain a bearer remaining unchanged in a bearer context to be deleted.

The MME notifies the SGW of context information of bearers to be kept unchanged in one of the following several manners.

Manner I: including context information of bearers to be modified and context information of bearers to be deleted in the modify bearer request message. The SGW thinks that bearers present in the UE context of the SGW but not contained in the modify bearer request message (not bearers to be modified or not bearers to be deleted) are not changed and thus does not discard but reserves the downlink data packet and sends a downlink data notification to the MME when receiving a downlink data packet in the bearer.

Manner II: including in the modify bearer request message a list of identifiers of unchanged bearers. Thereby, the SGW knows that the bearers are not changed and thus does not discard but reserves the downlink data packet and sends a downlink data notification to the MME when receiving a downlink data packet in the bearer.

With the above processing, presence of bearers remaining unchanged during switch can be indicated to the MME. Thereby, it is ensured that those bearers are not deleted and assure no data loss.

Figure 4:
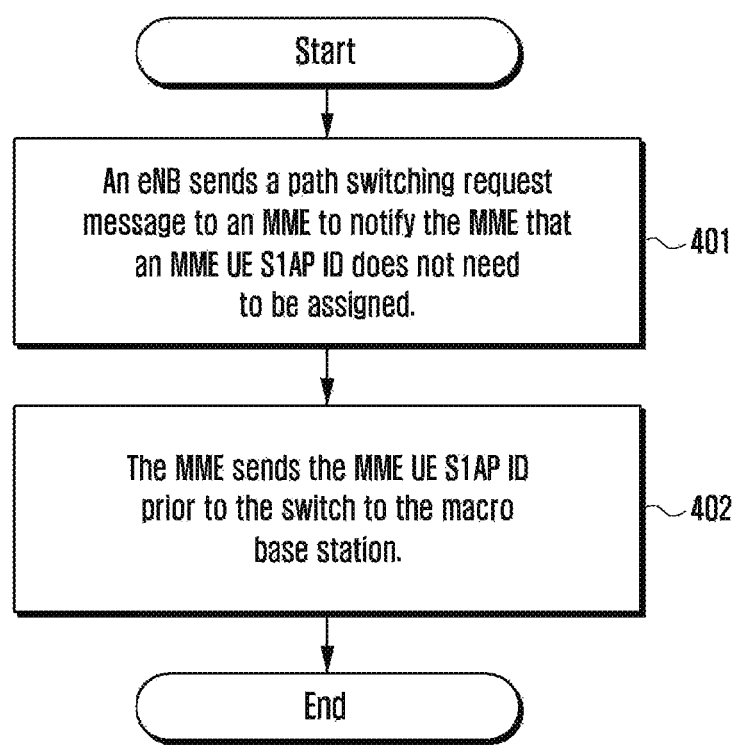
FIG. 4 is a schematic diagram illustrating a switch supporting method of notifying an MME that an MME UE S1AP ID does not need to be assigned in accordance with the present invention.

FIG. 4 is a schematic diagram illustrating a switch supporting method of notifying an MME that an MME UE S1AP ID does not need to be assigned in accordance with the present invention. The switch supporting method comprises the following steps.

In step 401, an eNB sends a path switching request message to a MME. The eNB notifies the MME of information on a bearer remaining unchanged and information on a switched bearer. The MME is notified with a path switching request that an MME UE S1AP ID does not need to be assigned.

The eNB notifies the MME that a MME UE S1AP ID does not need to be assigned and the MME UE S1AP ID prior to switch is to be reused in one of the following manners.

Manner I: including in the path switching request message explicit indication information that an MME UE S1AP ID does not need to be assigned.

Manner II: including information on bearers remaining unchanged in the path switching request message. The information on bearers remaining unchanged may take one of the several forms given in step 301, e.g., a list of identifiers of bearers remaining unchanged or information for indicating that a bearer not in a list of identifiers of bearers to be switched is not released. Thereby, the MME is notified that an MME UE S1AP ID does not need to be assigned and the MME UE S1AP ID prior to switch is to be reused.

Manner III: the MME knows that an MME UE S1AP ID does not need to be assigned and the MME UE S1AP ID prior to switch is to be reused, according to comparison of an Evolved Cell Global Identifier (ECGI) contained in the path switching request message to the ECGI of the cell where the UE is before the path switching request message is received, i.e., by using information that the serving cells or serving base stations prior to and after the switch of the UE are the same (an ECGI contains an identifier of the PLMN and an identifier of a cell and the identifier of a cell contains an identifier of a base station, and thus the identifier of a base station can be acquired from the ECGI).

In step 402, the MME sends a path switching request confirmation message to the eNB. Herein, the MME sends the original MME UE S1AP ID to the eNB. Thereby, the logical signaling connection of the UE between the eNB and the MME is kept unchanged and unique.

With the above processing manners shown in FIG. 4, in a case where a part of bearers are switched (the control plane node for the UE is kept at the source base station), the MME sends the MME UE S1AP ID of the UE prior to the switch to a base station and a new MME UE S1AP ID will not be assigned for the UE. Thereby, it is avoided that two logic connections for the UE appear in the same interface and successful performing of the switch is ensured.

Figure 5:
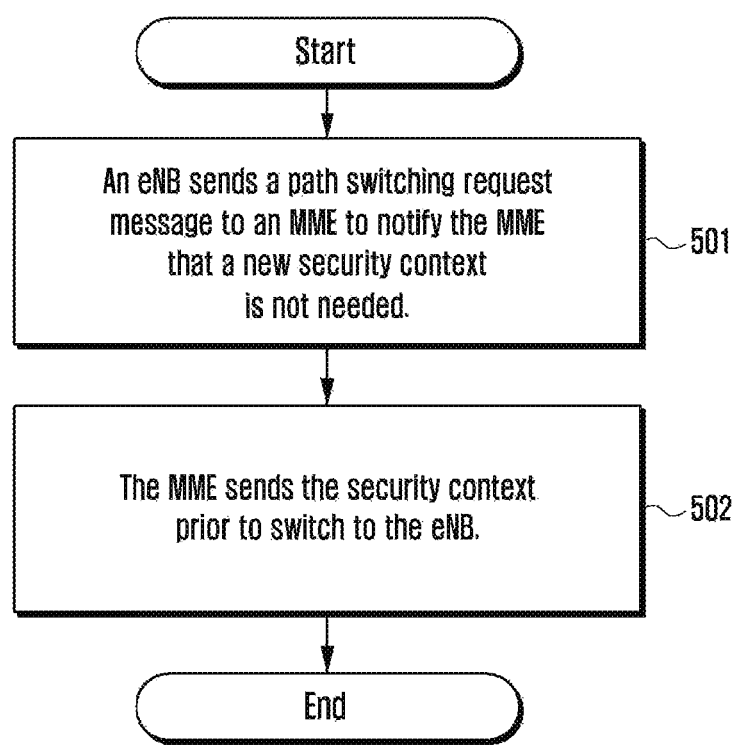
FIG. 5 is a schematic diagram illustrating a switch supporting method of notifying an MME that a new security context is not needed in accordance with the present invention.

FIG. 5 is a schematic diagram illustrating a switch supporting method of notifying a MME that a new security context is not needed in accordance with the present invention. The switch supporting method comprises the following steps.

In step 501, an eNB sends a path switching request message to a MME. The eNB notifies the MME of information on a bearer remaining unchanged and information on a switched bearer. The MME is notified in the path switching request message that a new security context is not needed and the security context prior to the switch is to be reused.

The eNB notifies the MME that a new security context is not needed and the security context prior to the switch is to be reused in one of the following several manners.

Manner I: including in the path switching request message explicit indication information that a new security context is not needed.

Manner II: including information on bearers remaining unchanged in the path switching request message. The information on bearers remaining unchanged may take one of the several forms given in step 301, e.g., a list of identifiers of bearers remaining unchanged or information for indicating that a bearer not in a list of identifiers of bearers to be switched is not released. Thereby, the MME is notified that a new security context is not needed and the security context prior to switch is to be reused.

Manner III: the MME knows that a new security context is not needed and the security context prior to switch is to be reused, according to comparison of an Evolved Cell Global Identifier (ECGI) contained in the path switching request message to the ECGI of the cell where the UE is before the path switching request message is received, i.e., by using information that the serving cells or serving base stations prior to and after the switch of the UE are the same (an ECGI contains an identifier of the PLMN and an identifier of a cell and the identifier of a cell contains an identifier of a base station, and thus the identifier of a base station can be acquired from the ECGI).

In step 502, the MME sends a path switching request confirmation message to the eNB. Herein, the MME sends the security context prior to switch to the eNB. Thereby, synchronization of the security contexts between the eNB and the MME and between eNB and the UE is maintained.

With the above processing shown in FIG. 5, in a case where a part of bearers are switched (the control plane node for the UE is kept at the source base station), the MME sends the security context prior to the switch to a base station and a new security context is not be assigned. Thereby, it will not result in that the NCCs at the UE and at the network side do not match, and thus performing of the switch successfully and a service continuity is ensured.

Detailed implementation of the above switch supporting methods in the present application is hereinafter described by means of specific embodiments.

Figure 6:
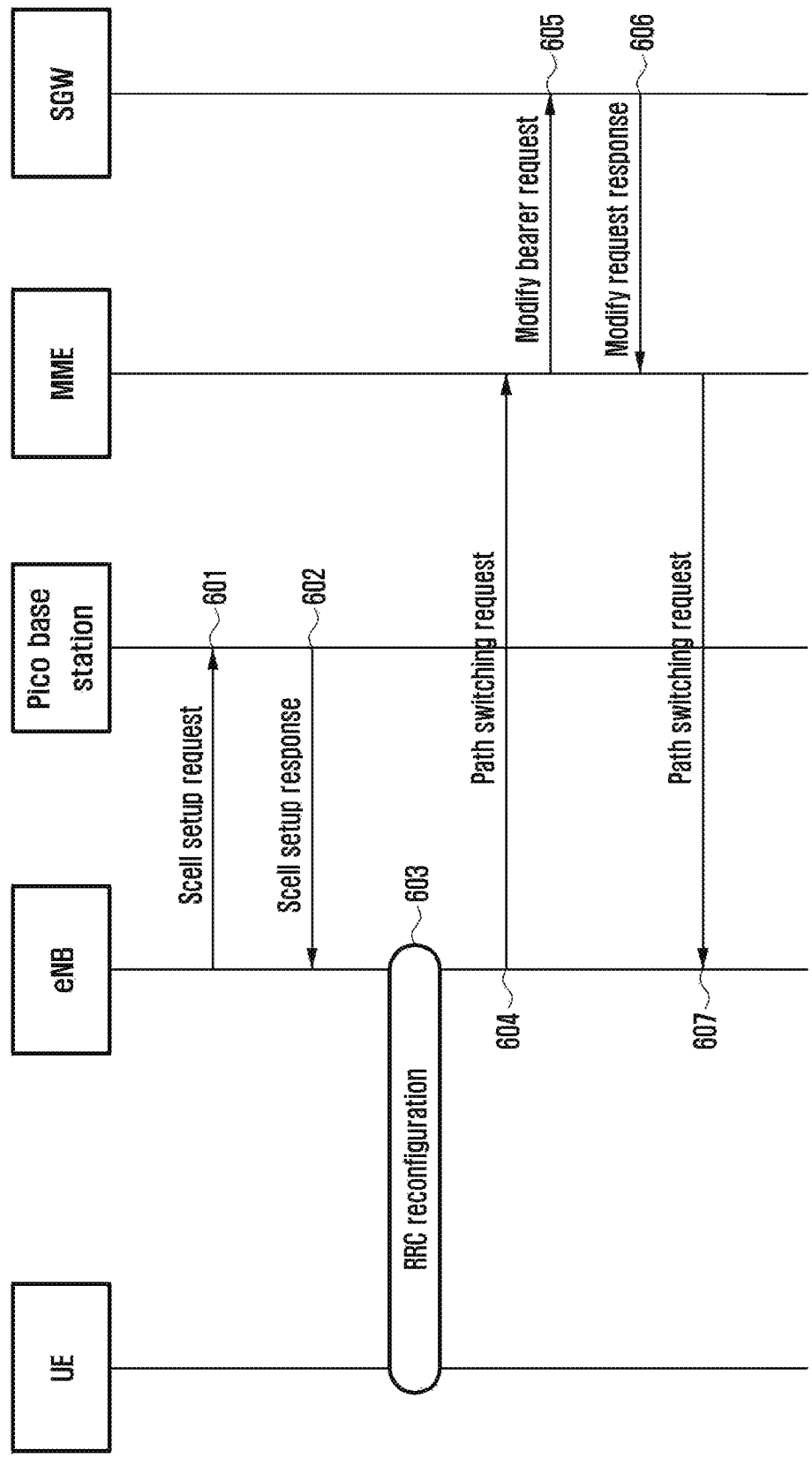
FIG. 6 is a schematic diagram illustrating a flow of embodiment I of supporting switch in accordance with the present invention.

Embodiment I of supporting switch in accordance with the present invention is shown in FIG. 6. This embodiment can be used in a scenario where a eNB serving a UE remains unchanged and is ready to switch a part of bearers of the UE from the eNB to a pico base station or from a pico base station 1 to a pico base station 2. The figure and the following description are given with an example that the eNB switches a part of bearers of the UE from the eNB to a pico base station, but are also applicable to a scenario where the eNB switches a part of bearers of the UE from a pico base station 1 to a pico base station 2 and other scenarios.

In step 601, a source eNB sends a second cell (Scell) setup request message to a pico to request the pico to allocate resources for a part of ERABs of a UE. The message contains identifiers of the ERABs, a parameter of Quality of Service (QoS) of the ERABs and an uplink GTP TEID. The pico cell assigns a downlink TEID and a transport layer address for the requesting ERABs.

In step 602, the pico base station sends a S cell setup response message to the eNB. The message contains a list of accepted ERABs. The list of accepted ERABs contains an identifier of an ERAB and a downlink TEID and a transport layer address assigned to the ERAB by the pico base station. The pico base station notifies the eNB of an unaccepted ERAB in either of the following two manners. Manner I, an implicit notification manner: an ERAB contained in the Scell setup request message but not contained in the list of accepted ERABs of the Scell setup response message is an unaccepted ERAB. Manner II: including in the Scell setup response message a list of unaccepted ERABs, the list of unaccepted ERABs containing an identifier of an unaccepted ERAB and/or a reason why the ERAB is not accepted.

In step 603, the eNB reconfigures the UE. The eNB sends an RRC reconfiguration request message to the UE and the UE sends an RRC reconfiguration response message to the eNB.

In step 604, the eNB sends a path switching request message to the MME. The eNB notifies the MME of information on an ERAB not switched or released. The method in which the eNB notifies the MME of information on an ERAB not switched or released is the same as that in step 301 and thus will not be repeated herein. The eNB notifies the MME that a new MME UE S1AP ID does not need to be assigned and the MME UE S1AP ID prior to switch is to be reused. The manner in which the eNB notifies the MME that a new MME UE S1AP ID does not need to be assigned is the same as that in step 401 and thus will not be repeated herein.

There are the following two security processing mechanisms for a scenario where a eNB remains unchanged and only a part of bearers is switched to a pico or a eNB remains unchanged and bearers served by pico 1 are switched to a pico 2.

Manner I: the security context of the UE is updated at the UE and at the network side as it is in normal switch. In this manner, the manner in which the MME processes a security mechanism after receiving the path switching request message is the same as that in the prior art and thus will not be repeated herein.

Manner II: the security context of the UE is not updated at the UE and at the network side and the security context of the UE prior to the switch is reused. In this manner, the eNB notifies the MME that a new security context is not needed and the security context of the UE prior to the switch is to be reused. The manner in which the eNB notifies the MME is the same as that in step 501 and thus will not be repeated herein. The MME contains the security context prior to the switch in a path switching request conformation message in step 607.

In step 605, for those unchanged bearers in the path switching request message in step 604, the MME reserves the bearer unchanged and does not trigger a bearer deactivation process. The MME triggers a bearer deactivation process for a bearer released in an access network.

The MME keeps the SGW serving the UE unchanged and does not select a new SGW if there is a bearer remaining unchanged.

The MME sends a modify bearer request message to the SGW. The method in which the MME notifies the SGW of a bearer to be switched and a bearer remaining unchanged is the same as that in step 302 and thus will not be repeated herein. For a bearer remaining unchanged, the SGW does not discard a downlink data packet when receiving it. The SGW sends a downlink data notification to the MME.

In step 606, the SGW sends a modify bearer response message to the MME.

In step 607, the MME sends a path switching request confirmation message to the eNB. The message contains the MME UE S1AP ID that was used for the UE prior to the switch.

Thus, the flow of the method of embodiment I end.

Figure 7:
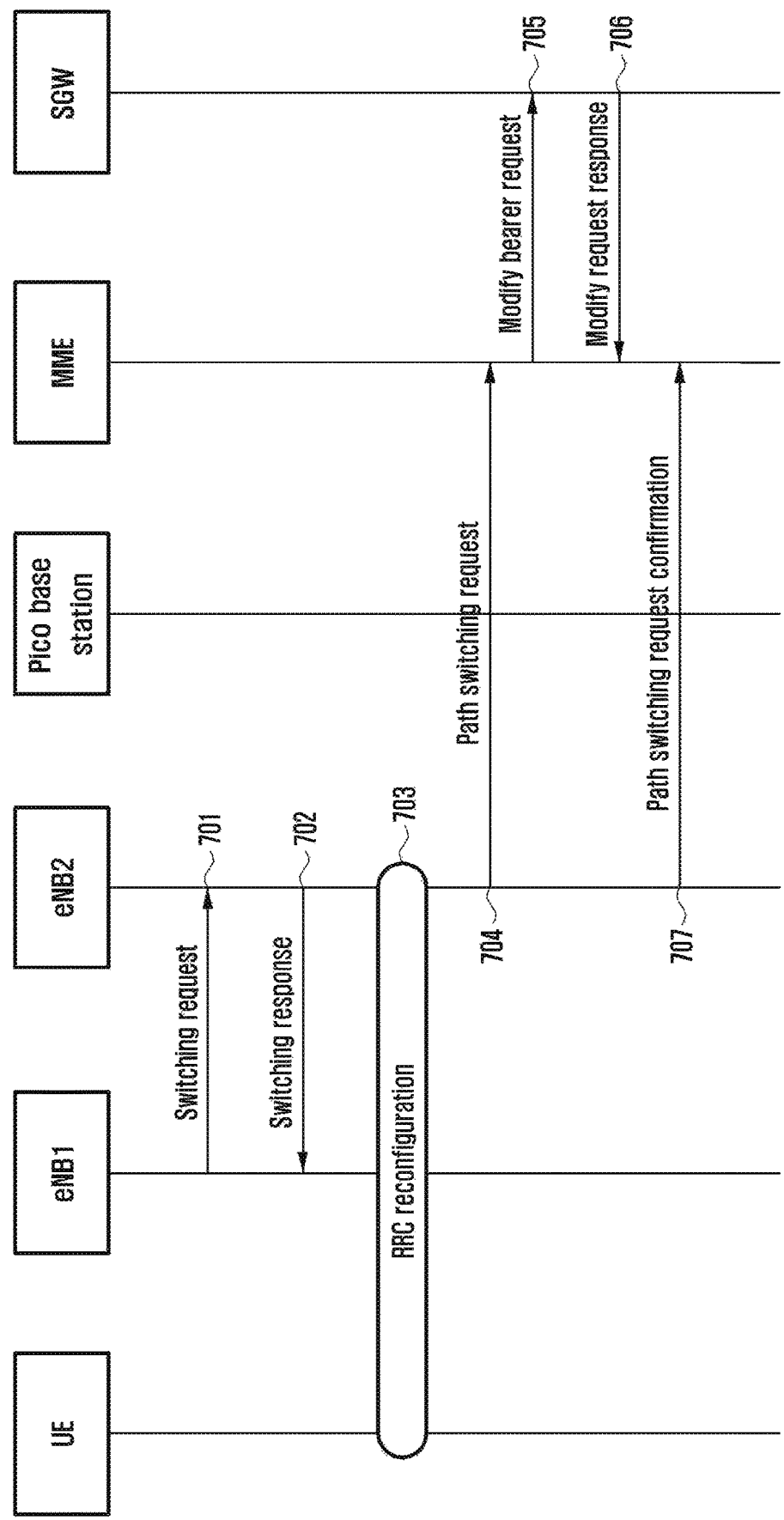
FIG. 7 is a schematic diagram illustrating a flow of embodiment II of supporting switch in accordance with the present invention.

Embodiment II of supporting switch in accordance with the present invention is shown in FIG. 7. This embodiment can be used where the eNB serving a UE is changed and a pico base station remains unchanged. A eNB1 switches a control plane for the UE and a bearer of the eNB1 to a eNB2.

In step 701, the eNB1 sends a switch request message to the eNB2. The message contains context information of the UE at the pico, and the context information of the UE at the pico contains a base station identifier of the pico or a cell identifier of the UE at the pico. The context information of the UE at the pico also contains an eNB UE S1AP ID assigned to the UE by the pico. The context information of the UE at the pico contains a list of bearers' information remaining unchanged at the pico. The bearers' information at the pico contains identifiers of the bearers remaining changed.

In step 702, the eNB2 sends a switch response message to the eNB1.

In step 703, the eNB1 reconfigure the UE. The eNB1 sends an RRC reconfiguration request message to the UE and the UE sends an RRC reconfiguration response message to the eNB2.

In step 704, the eNB2 sends a path switching request message to the MME. The eNB2 notifies the MME of information on an ERAB not switched or released (remaining unchanged). The method in which the eNB notifies the MME of information on an ERAB not switched or released is the same as that in step 301 and thus will not be repeated herein.

In step 705, for those unchanged bearers in the path switching request message in step 704, the MME reserves the bearer unchanged and does not trigger a bearer deactivation process. The MME triggers a bearer deactivation process for a bearer released in an access network.

The MME keeps the SGW serving the UE unchanged and does not select a new SGW if there is a bearer remaining unchanged.

The MME sends a modify bearer request message to the SGW. The method in which the MME notifies the SGW of a bearer to be switched and a bearer remaining unchanged is the same as that in step 302 and thus will not be repeated herein. For a bearer remaining unchanged, the SGW does not discard a downlink data packet but reserves the downlink data packet when receiving it. The SGW sends a downlink data notification to the MME.

In step 706, the SGW sends a modify bearer response message to the MME.

In step 707, the MME sends a path switching request confirmation message to the eNB2.

Thus, the flow of the method of embodiment II ends.

As can be seen from the above detailed implementation of the present invention, in accordance with the present invention, in a case where a UE moves in a small cell scenario, a core network can be notified of switch of bearers correctly and an MME will be notified of bearers remaining unchanged and thereby the MME reserves these bearers. Thus, it is avoided that the MME deletes the bearers remaining unchanged, and data loss is avoided. And, in a case where a part of bearers are switched, the MME uses an MME UE S1AP ID assigned to the UE prior to the switch and will not assign a new MME UE S1AP ID to the UE. Thereby, it is avoided that two logical connections of the UE appear in the same interface, and successful performing of the switch is ensured. Further, in a case where a part of bearers are switched, the MME may not assign a new security context and reuse a security context prior to the switch. Thereby, it will not result in that the NCCs at the UE and at the network side do not match, and thus performing of the switch successfully and a service continuity is ensured.

The foregoing is only preferred embodiments of the present invention and is not for use in limiting this invention. Any modification, equivalent replacement or improvement made in accordance with the spirit and principles of the present invention is included in the protection scope of the present invention.

What is claimed is:

1. A method performed by a master base station in a system for applying carrier aggregation using the master base station and a secondary base station, the method comprising:
    transmitting, to a network entity for managing a mobility, a first request message requesting modification for one or more paths associated with a user equipment (UE), the first request message including first information on at least one path associated with the UE, which is to be modified to the secondary base station, and second information on at least one path associated with the UE, which remains unmodified in the master base station; and
    receiving, from the network entity for managing the mobility, a confirmation message in response to the first request message,
    wherein the first request message and the confirmation message include an identifier of the UE for the network entity for managing the mobility which is allocated to the UE before the first request message is transmitted without a newly assigned identifier of the UE for the network entity for managing the mobility, and
    wherein the at least one path to be modified is transferred from the master base station to the secondary base station.

2. The method of claim 1,
    wherein a second request message is transmitted based on the first request message, from the network entity for managing the mobility, for a network entity for managing a user plane function, and
    wherein the second request message is for requesting modification of one or more paths.

3. The method of claim 1, wherein the first information includes at least one identifier of the at least one path to be modified.

4. The method of claim 1, wherein the second information includes at least one identifier of the at least one path which remains unmodified.

5. The method of claim 2, wherein the network entity for managing the user plane function is unchanged.

6. A method performed by a network entity for managing a mobility in a system for applying carrier aggregation using a master base station and a secondary base station, the method comprising:
    receiving, from the master base station, a first request message requesting modification for one or more paths associated with a user equipment (UE), the first request message including first information on at least one path associated with the UE, which is to be modified to the secondary base station and second information on at least one path associated with the UE, which remains unmodified in the master base station; and
    transmitting, to the master base station, a confirmation message in response to the first request message,
    wherein the first request message and the confirmation message include an identifier of the UE for the network entity for managing the mobility which is allocated to the UE before the first request message is transmitted without a newly assigned identifier of the UE for the network entity for managing the mobility, and
    wherein the at least one path to be modified is transferred from the master base station to the secondary base station.

7. The method of claim 6, further comprising:
transmitting a second request message based on the first request message for a network entity for managing a user plane function,
wherein the second request message is for requesting modification of one or more paths.

8. The method of claim 6, wherein the first information includes at least one identifier of the at least one path to be modified.

9. The method of claim 6, wherein the second information includes at least one identifier of the at least one path which remains unmodified.

10. The method of claim 7, wherein the network entity for managing the user plane function is unchanged.

11. A master base station in a communication system for applying carrier aggregation using the master base station and a secondary base station, the master base station comprising:
a transceiver; and
a controller configured to:
  transmit, to a network entity for managing a mobility, a first request message requesting modification for one or more paths associated with a user equipment (UE), the first request message including first information on at least one path associated with the UE, which is to be modified to the secondary base station, and second information on at least one path associated with the UE, which remains unmodified in the master base station, and
  receive, from the network entity for managing the mobility, a confirmation message in response to the first request message,
wherein the first request message and the confirmation message include an identifier of the UE for the network entity for managing the mobility which is allocated to the UE before the first request message is transmitted without a newly assigned identifier of the UE for the network entity for managing the mobility, and
wherein the at least one path to be modified is transferred from the master base station to the secondary base station.

12. The master base station of claim 11,
wherein a second request message is transmitted based on the first request message, from the network entity for managing the mobility, for a network entity for managing a user plane function, and
wherein the second request message is for requesting modification of one or more paths.

13. The master base station of claim 11, wherein the first information includes at least one identifier of the at least one path to be modified.

14. The master base station of claim 11, wherein the second information includes at least one identifier of the at least one path which remains unmodified.

15. The master base station of claim 12, wherein the network entity for managing the user plane function is unchanged.

16. A network entity for managing a mobility in a system for applying carrier aggregation using a master base station and a secondary base station, the network entity comprising:
a transceiver; and
a controller configured to:
  receive, from the master base station, a first request message requesting modification for one or more paths associated with a user equipment (UE), the first request message including first information on at least one path associated with the UE, which is to be modified to the secondary base station and second information on at least one path associated with the UE, which remains unmodified in the master base station, and
  transmit, to the master base station, a confirmation message in response to the first request message,
wherein the first request message and the confirmation message include an identifier of the UE for the network entity for managing the mobility which is allocated to the UE before the first request message is transmitted without a newly assigned identifier of the UE for the network entity for managing the mobility, and
wherein the at least one path to be modified is transferred from the master base station to the secondary base station.

17. The network entity of claim 16,
wherein the controller is further configured to transmit a second request message based on the first request message for a network entity for managing a user plane function, and
wherein the second request message is for requesting modification of one or more paths.

18. The network entity of claim 16, wherein the first information includes at least one identifier of the at least one path to be modified.

19. The network entity of claim 16, wherein the second information includes at least one identifier of the at least one path which remains unmodified.

20. The network entity of claim 17, wherein the network entity for managing the user plane function is unchanged.

* * * * *